United States Patent
Ohmi et al.

[11] Patent Number: 5,923,779
[45] Date of Patent: Jul. 13, 1999

[54] COMPUTING CIRCUIT HAVING AN INSTANTANEOUS RECOGNITION FUNCTION AND INSTANTANEOUS RECOGNITION METHOD

[75] Inventors: Tadahiro Ohmi; Tadashi Shibata, both of Sendai, Japan

[73] Assignee: President of Tohoku University, Miyagi-Ken, Japan

[21] Appl. No.: 08/719,915

[22] Filed: Sep. 25, 1996

[30] Foreign Application Priority Data

Oct. 3, 1995 [JP] Japan .................................. 7-256550

[51] Int. Cl.⁶ ...................................................... G06K 9/46
[52] U.S. Cl. ......................... 382/190; 382/191; 382/192; 382/195; 382/218
[58] Field of Search .................................... 382/190, 191, 382/192, 195, 218

[56] References Cited

U.S. PATENT DOCUMENTS

| | | | |
|---|---|---|---|
| 3,292,148 | 12/1966 | Giuliano et al. | 340/146.3 |
| 4,710,724 | 12/1987 | Connell et al. | 330/9 |
| 5,057,019 | 10/1991 | Harvey | 434/155 |
| 5,239,500 | 8/1993 | Oguey | 365/45 |
| 5,426,700 | 6/1995 | Berson | 380/23 |
| 5,432,864 | 7/1995 | Lu et al. | 382/118 |
| 5,438,293 | 8/1995 | Guerrieri et al. | 327/355 |
| 5,506,801 | 4/1996 | Tawel | 364/807 |
| 5,555,521 | 9/1996 | Hamada et al. | 382/118 |
| 5,682,109 | 10/1997 | Ohmi et al. | 327/57 |
| 5,703,503 | 12/1997 | Miyamoto et al. | 327/58 |

OTHER PUBLICATIONS

IEEE Journal of Solid–State Circuits, Jul. 28, 1993, New York, A 40×40 CCD/CMOS Absolute–Valve–of–Difference Processor for Use in a Stereo Vision System, J. Mikko Hakkarainen et al.
European Search Report Dated Apr. 2, 1998.
Partial European Search Report Dated Dec. 2, 1997.

*Primary Examiner*—Jose L. Couso
*Assistant Examiner*—Kanji Patel
*Attorney, Agent, or Firm*—Baker & Daniels

[57] ABSTRACT

The present invention has as an object thereof to provide an intelligent electronical system which conducts the real-time recognition of real world data and makes decisions with respect to the data; that is to say, a computing circuit having an instantaneous recognition function and instantaneous recognition method. The invention relates to a computing circuit which selects predetermined codes with respect to a group of inputted signals comprising a plurality of analog signals, which is provided with: a mechanism whereby the group of inputted signals is converted to a group of input variables comprising a number of analog variables or multilevel variables which is smaller in number than analog signals, a memory circuit which stores a plurality of data comprising groups of a plurality of analog or multilevel variables determined in advance, a circuit which conducts a predetermined comparison operation between the group of input variables and a plurality of data stored in the memory circuit simultaneously and in parallel, and a mechanism for selecting at least one code corresponding to data which fit predetermined conditions, as a result of the comparison operation.

5 Claims, 9 Drawing Sheets

COMPUTING CIRCUIT HAVING AN INSTANTANEOUS RECOGNITION FUNCTION AND INSTANTANEOUS RECOGNITION METHOD

BACKGROUND OF THE INVENTION

1. Field of the Invention

The present invention relates to a computing circuit having an instantaneous recognition function and to a method for instantaneous recognition, and more particularly relates to a computing circuit which accepts external data and has a function which conducts the instantaneous recognition of these data.

2. Description of the Related Art

Progress in the field of electronics has been truly astonishing; however, there exists as yet no electronic system having intelligent functions whereby judgements are made with respect to external situations and appropriate actions are taken, as is the case with human beings. Present computer systems are capable of the very rapid execution of four-rule arithmetical calculations; however, real-time response, such as in the case in which an animal such as a frog or the like sees an airborne fly, promptly initiates a response, and instantly captures the prey, or, alternatively, recognizes that an enemy has arrived, and runs away, are completely impossible. The reason for this is that data processing is conducted by means of binary digital calculation on the basis of strict Boolean algebra.

All external data are originally in an analog form, and contain a lot of redundant data. Let us consider, for example, the case in which the airborne fly is captured on the retina as an image, and this is then recognized to be a fly. The fly may be traveling in a number of directions, so that the signal values at the level of the picture elements may have a variety of values. Furthermore, if the movement is rapid, the image may become blurred and the accuracy of the image may worsen. That is to say, the analog signal values at the level of the individual picture elements (the neuroepithelial cells of the retina) are extremely unclear, and may further contain a great deal of noise. Additionally, background data are also included, so that the real world data represent an enormous amount of data in their native form. In present-day digital computer technology, the picture elements are subjected to A/D conversion one by one and are all expressed as digital variables having values of 0 or 1, and processing is conducted by means of sequential computation.

Additionally, if the case of an image sensor having 500×500 picture elements is considered, the number of picture elements is 250,000, and since the signals representing the 3 basic colors of red, green, and blue for one picture element are each represented by one byte (8 bits), then the amount of data per screen becomes enormous, being 750,000 bytes. Since such an enormous amount of data is inputted moment by moment, it is impossible to conduct image recognition in real time no matter what kind of supercomputer is employed.

So-called intelligent sensor technology has been developed in which, for example, a small processor is provided for each cell in the two-dimensional array of the image sensor, and high speed processing is realized by means of parallel processing. The calculations involving the elimination of noise, the detection of edges, the emphasis of edges, the detection of orientation, and the like can be executed at high speed using data from picture elements in the vicinity. However, even if such image processing is achieved, the realization of functions such as so-called recognition or decision, in which a determination is made as to what the image is or the appropriate action to take in response to the inputted image, has as yet not been achieved. Techniques exist for conducting recognition using a computer by means of software processing using a knowledge base; however, since the amount of calculation to be executed is enormous, it is impossible to achieve real-time responses even if a large scale supercomputer is employed.

That is to say, in order to provide present-day electronic systems with intelligent functions such as those of human beings, the development of hardware possessing functions such as recognition and judgement is indispensable.

SUMMARY OF THE INVENTION

The present invention was created in response to the problems described above; it has as an object thereof to provide an intelligent electronic system which conducts recognition and judgement with respect to external data in real time; that is to say, the invention has as an object thereof to provide a computing circuit having instantaneous recognition functions and a method for instantaneous recognition.

The computing circuit having an instantaneous recognition function in accordance with the present invention is a computing circuit which extracts predetermined codes with respect to a group of inputted signals comprising a plurality of analog signals, which circuit is provided with: a mechanism for converting this group of inputted signals to a group of inputted variables comprising a smaller number of analog variables or multilevel variables than the number of analog signals described above, a memory circuit which stores and maintains a plurality of data comprising a grouping of a plurality of predetermined analog or multilevel variables, a circuit which simultaneously conducts the predetermined comparison of the group of inputted variables with the plurality of data stored in the memory circuit by means of parallel processing, and a mechanism for extracting at least one code corresponding to data meeting predetermined conditions, as a result of the comparison conducted.

In the instantaneous recognition method in accordance with the present invention, the characteristics of an inputted signal group comprising a plurality of analog signals are extracted, these are expressed by means of a group of scalar variables which is smaller in number than the analog signals, a group of these scalar variables is compared with groups of preestablished characteristic amount variables, and by means of finding the group of characteristic amount variables for which the difference is smallest, the specification of the input signal group is conducted.

The executed form of the present invention will be explained using the block diagram shown in FIG. 1.

In FIG. 1, reference 101 indicates a two-dimensional image sensor of, for example, 500 picture elements×500 picture elements, and each picture element 102 comprises two elements: a bipolar type image sensor BASIS 103, which has the function of converting an optical signal to a voltage signal, and storing this signal, and a processor 104, constructed using neuron MOS transistors (νMOS). The νMOS is an MOS type transistor having a floating gate; a plurality of electrodes which are capacitively coupled with the floating gate serve as elements forming input terminals, and have the function of multi-input computing elements; because these transistors have functions which are similar to those of living nerve cells, or neurons, they are termed neuron MOS or νMOS for short (T. Shibata and T. Ohmi, IEEE Trans. Electron Devices, Vol. 39, No. 6, pp 1444–1455 (1992)). The νMOS data processor 104 conducts image processing calculations such as the removal of noise, the detection of edges, the detection of bearings, and the like by means of taking in data from the 8 surrounding picture elements and conducting calculations. Since parallel processing is conducted with respect to all picture elements, it is possible to conduct processing in an extremely short period of time. Furthermore, by means of further compressing these data, the characteristics of the image are captured, and for example, a characteristic vector C (105) comprising 16 multilevel signal groups C1–C16 is outputted. C1–C16 represent multilevel voltage signals having 10 discrete values within a range of 0 V–5 V (the power source voltage). A concrete example of the structure of the circuitry is shown in FIG. 2.

However, a variety of circuit structures have been proposed for such compression systems of 2-dimensional images. For example, conventionally known technology such as that disclosed in Christof Koch and Hua Li, [Implementing Vision Algorithms with Analog VLSI Circuits] (IEEE Computer Society Press, Washington, 1995, ISBNO-8186-6492-4), may be employed.

Furthermore, if the so called neural network technology is employed, data processing can be conducted in an extremely efficient manner. Furthermore, if processor 104 is constructed using vMOS, high functionality may be realized using a small number of elements, so that this is extremely advantageous for ultra large scale integration; however, analog computing circuits or digital computing circuits employing conventional MOS transistors or the like may be employed.

Additionally, C1–C16 may be analog variables which continuously vary within a range of 0–5 V. In short, with respect to inputted image signals, the important characteristics thereof are expressed by scalar variables C1–C16, which are greatly fewer in number than the entire number of picture elements, and this mechanism may employ any sort of conventional technology. What is important in the present invention is the instantaneous recognition and judgement of codes expressed by the scalar variables C1–C16; this will be explained in the following.

Characteristic vector C (105) is compared with a variety of template vectors using the vector comparator 106. Reference 107 indicates a large scale memory; herein are stored approximately 100,000 groups of template vectors. Within large scale memory 107, 1,000 template vectors, for example, are transmitted together to vector comparator 106 and are temporarily stored, and a comparison operation is conducted with the characteristic vector C (105). An example of the structure of this vector comparator 106, as well as an example of the structure of the large scale memory 107, are depicted in, respectively, FIG. 3, and FIGS. 6 and 8.

The function of the vector comparator 106 is to calculate the degree of agreement between each element C1–C16 of the characteristic vector C and each element M1–M16 of the various template vectors within the memory. For example, D=|C1−M1|+|C2−M2|+. . . +|C16−M16| is calculated, and a voltage value proportional to this value is outputted for all template vectors temporarily stored in the vector comparator 106.

Reference 108 indicates a so called winner-take-all circuit; it has the function of specifying, among the 1,000 data outputted from the vector comparator, the data for which D has a minimum value. That is to say, the data most closely resembling the characteristic vector C are automatically selected. Various code numbers are provided, for example in the form of binary code, for each template vector, and these codes indicate what the image is which was captured on the 2-dimensional image sensor 101.

In the present example, a comparison operation was discussed with respect to 1,000 template vectors; however, such operations may be successfully carried out with respect to all template vectors in the memory 107. At this time, the comparison operation with 1,000 data is repeated 100 times, and the best candidates obtained by each comparison operation are ultimately compared once more, and final candidates are thus obtained.

A single comparison operation can be executed in approximately 100 nanoseconds, so that it is possible to specify what the image is in approximately 10 microseconds even if a comparison with all data is conducted. The real time response of human beings is approximately 0.1 seconds, while the speed of the mechanical control of robots is on the level of 1 millisecond at its fastest. If these facts are taken into consideration, it can be seen that the system of the present invention is capable of very high speed recognition.

DESCRIPTION OF THE REFERENCES

| | |
|---|---|
| 101 | two dimensional image sensor, |
| 102 | picture element, |
| 103 | bipolar type image sensor (BASIS), |
| 104 | vMOS data processor, |
| 105 | characteristic vector, |
| 106 | vector comparator 1, |
| 107 | large scale memory, |
| 108 | winner-take-all (WTA) circuit, |
| 201 | two dimensional image sensor, |
| 202 | function of image sensor, |
| 203 | multilevel variable, |
| 204 | facial outline extracted from an inputted image |
| 206 | large scale associative memory, |
| 207 | memory cell, |
| 208, 209 | winner-take-all circuits, |
| 301, 302 | NMOS transistors, |
| 303, 304 | gate electrodes, |
| 305, 306 | drains of NMOS 301 and 302, |
| 307 | PMOS switch, |
| 308 | signal line, |
| 309, 310 | sources of NMOS 301 and 302, |

-continued

| | |
|---|---|
| 311, 313, 315 | switch elements, |
| 312, 314, 316 | ground potentials, |
| 313 | switch element, |
| 317, 318, 323, 324 | input electrodes, |
| 319, 320, 321, 322 | transmission gates, |
| 325 | external capacity loads, |
| 601 | NMOS transistor, |
| 602 | floating gate electrode, |
| 603 | drain, |
| 604 | power source line, |
| 605 | source, |
| 606 | external capacitance load, |
| 607 | electrode capacitively coupled with floating gate 602, |
| 608 | charge injection electrode, |
| 609 | tunnel junction, |
| 610 | capacity, |
| 611 | programing voltage ($V_{EXT}$) application terminal, |
| 612 | NMOS transistor, |
| 613 | floating gate, |
| 614 | switch, |
| 615 | signal line, |
| 801 | NMOS transistor, |
| 802 | floating gate electrode, |
| 803 | drain, |
| 804 | power source line, |
| 805 | source, |
| 806 | NMOS transistor, |
| 807 | common reading voltage line, |
| 808 | gate electrode, |
| 810 | electrode capacitively coupled with the floating gate, |
| 811 | NMOS transistor, |
| 812 | writing voltage generating line, |
| 814, 815, 816 | memory cells, |
| 817 | electrode capacitively coupled with common writing voltage generating line 812, |
| 818 | NMOS transistor, |
| 819 | source electrode, |
| 820 | gate electrode, |
| 821 | NMOS transistor, |
| 822 | input electrode, |
| 823 | inverter, |
| 824 | input of inverter, |
| 825 | NMOS transistor, |
| 826 | inverter output, |
| 901 | precedence determination circuit, |
| 902 | microprocessor. |

DESCRIPTION OF THE PREFERRED EMBODIMENTS

Next, the characteristics of the present invention will be made clear by explaining practical applications of this system.

(Preferred Embodiment 1)

Figure 2:
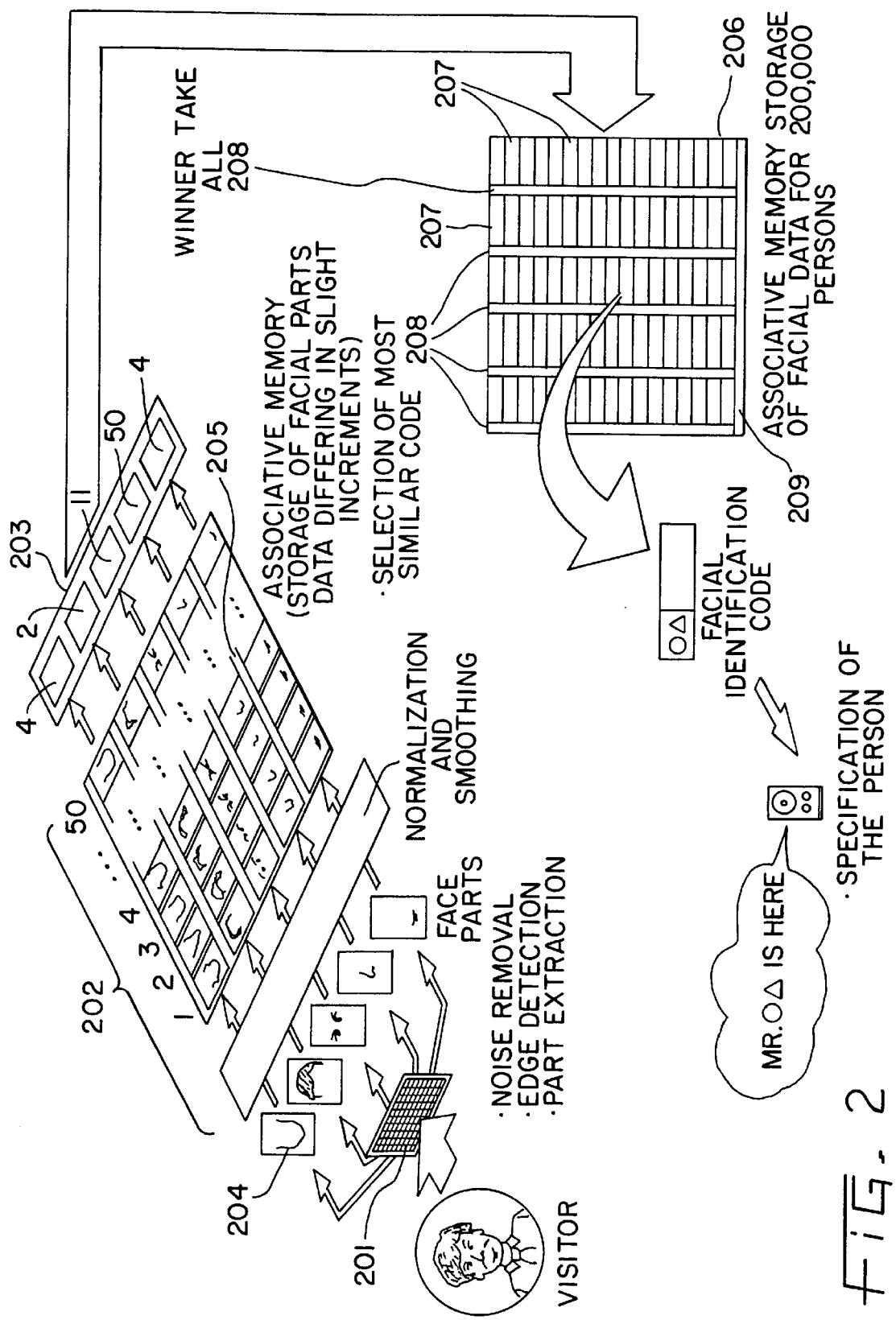
FIG. 2 is a conceptual diagram explaining the facial recognition system.

FIG. 2 is a block diagram showing a first embodiment of the present invention; this diagram shows the application of the present invention to a system for the recognition of human faces. Reference 201 indicates a two-dimensional image sensor similar to image sensor 101; it senses the image of, for example, the face of a customer who has come to a business. The optical system is provided with a zoom lens so that the image is projected at approximately the proper size in the central portion of the sensor, and this is automatically conducted by means of zooming and autofocus operations. If conventional camera technology and control by means of computers is employed, this may easily be achieved using conventional technology.

Reference 202 shows the typical function of this image sensor. First, after the removal of noise, the detection of the edges, and the like, the characteristics of the face are extracted. That is to say, the "outline of the face", "shape of the hair", "shape of the eyes", "shape of the nose", "shape of the mouth", and the like are divided in advance into, for example, 50 types, and the closest shape is determined, and the number thereof is specified as a multilevel variable. For example, in the example shown in the Figure, with respect to the characteristics "face", "hair", "eyes", "nose", and "mouth," the numbers 4, 2, 11, 50, and 4, respectively, are selected. This multilevel variable group 203 corresponds to the characteristic vector C (105) in FIG. 1. What is important here is the manner of the classification into 50 types. It is of essential importance that types having similar shapes be classified so as to have numbers which are close to one another. For example, facial outline numbers 4 and 5 correspond to shapes which greatly resemble one another. However, a number which is sufficiently distant from number 4, for example, number 20 or 30, has a shape which is considerably different from that of number 4.

In this way, the determination of the shape among the classified shapes which is most similar to each part of the inputted image may be conducted in the following manner. Here, the method will be explained with respect to facial outlines.

Figure 1:
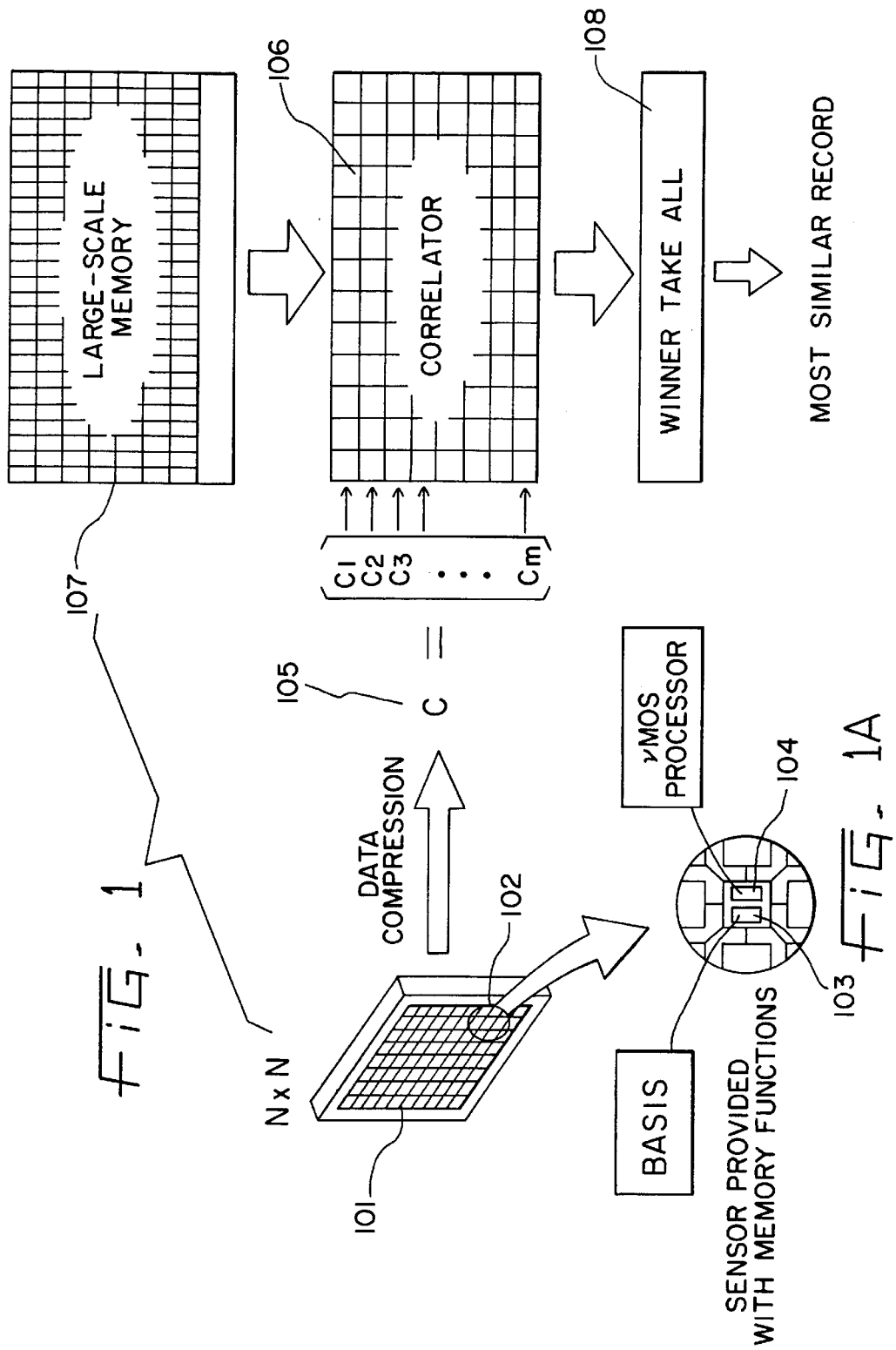
FIG. 1 is a conceptual diagram explaining the structure of the present invention.

Reference 204 represents the facial outline which was extracted from the inputted image; it is normalized so as to be approximately the same size as the 50 classified matching patterns, and is expressed as 2-dimensional picture image data. Each of the 50 classified matching patterns is also prepared as 2-dimensional picture element data, the absolute value of the difference between the two is determined for each picture element, and a value representing the sum of all these is obtained; the pattern for which this value is smallest may be selected by the winner-take-all circuit 205. This method is completely identical to the selection method for codes explained in FIG. 1. In the explanation of FIG. 1, 16 data were compared; however, here, the only difference is that since the data is 2-dimensional picture element data, the amount of data is larger, However, since this is a simple search for shape characteristics, it is sufficient if at most 30×30=900 data, that is to say, data for approximately 900 picture elements, is prepared.

The characteristic vector 203 of the inputted image which is selected in this manner is compared with facial data for 200,000 people which is stored in a large scale associative memory 206, and the most similar code is extracted. This selection method is identical to that explained in FIG. 1. Here, all the data are stored as ROM in a memory cell 207 having an absolute value calculation function, and the most similar data are determined by means of a two-stage parallel calculation using winner-take-all circuits 208 and 209.

That is to say, the most similar code in each row is selected by means of winner-take-all circuit group 208, and next, the most similar code among these is selected by winner-take-all circuit 209.

The code which is selected in this manner is a number which specifies each individual person, so that for example, if a separate memory is accessed using this number as an address, and all individual data relating to the person specified at that address are stored there.

Conventional memories (magnetic memory, semiconductor memory, and the like) are all accessed by means of addresses, and the necessary data can be immediately retrieved; however, it is extremely difficult to find these addresses. However, if the system of the present invention is employed, it is possible to quickly know the address in the memory at which the individual data of a visitor is stored simply by viewing the face of this visitor.

The advantages of the present method will be discussed below.

In Reference 202, with respect to 5 facial characteristics, one number is applied from among fifty numbers, so that the number of expressible cases is $50^{50}$, that is to say, approximately 300 million. However, the number of facial data stored in associative memory 206 corresponds to 200,000 people. In other words, with respect to each individual, 300 million÷200,000=1,500; that is to say, there are 1,500 possible combinations which correspond to each person. This means that the expression is extremely redundant, and the face of a single individual may be expressed by as many 1,500 different characteristic vectors. Since the individual is specified by the closest pattern resulting from the comparison, the specification will be accurate even if there are slight changes in the image.

In order to further increase the accuracy of individual specification, the following may be conducted. Instead of expressing each individual in terms of a single classified code, codes may be selected with respect to a variety of views, so that the individual may be expressed in terms of, for example, 10 classification codes. If this is done, if any of these 10 classifications is similar, all will be specified as the same individual. Accordingly, the chance of misidentification as an individual similar in appearance can be greatly reduced.

By means of the system of the present invention described above, it has become possible to conduct the instantaneous recognition of human faces which was impossible up to now using methods employing digital computers, since an enormous amount of calculation was required and real-time response was impossible; in addition to the recognition of visitors which was described here, the system is capable of broad application in anti-crime technology or the recognition of individual IDs or the like.

The case which was discussed referred only to the calculation of the absolute value in the case of the comparison of code; however, additionally, it is also possible to conduct addition of the square of the absolute value with respect to all components, and then obtain the square root thereof. That is to say, the minimum value of the Euclidean distance may be obtained. It is of course the case that additional distance definitions may be used.

(Preferred Embodiment 2)

Figure 3:
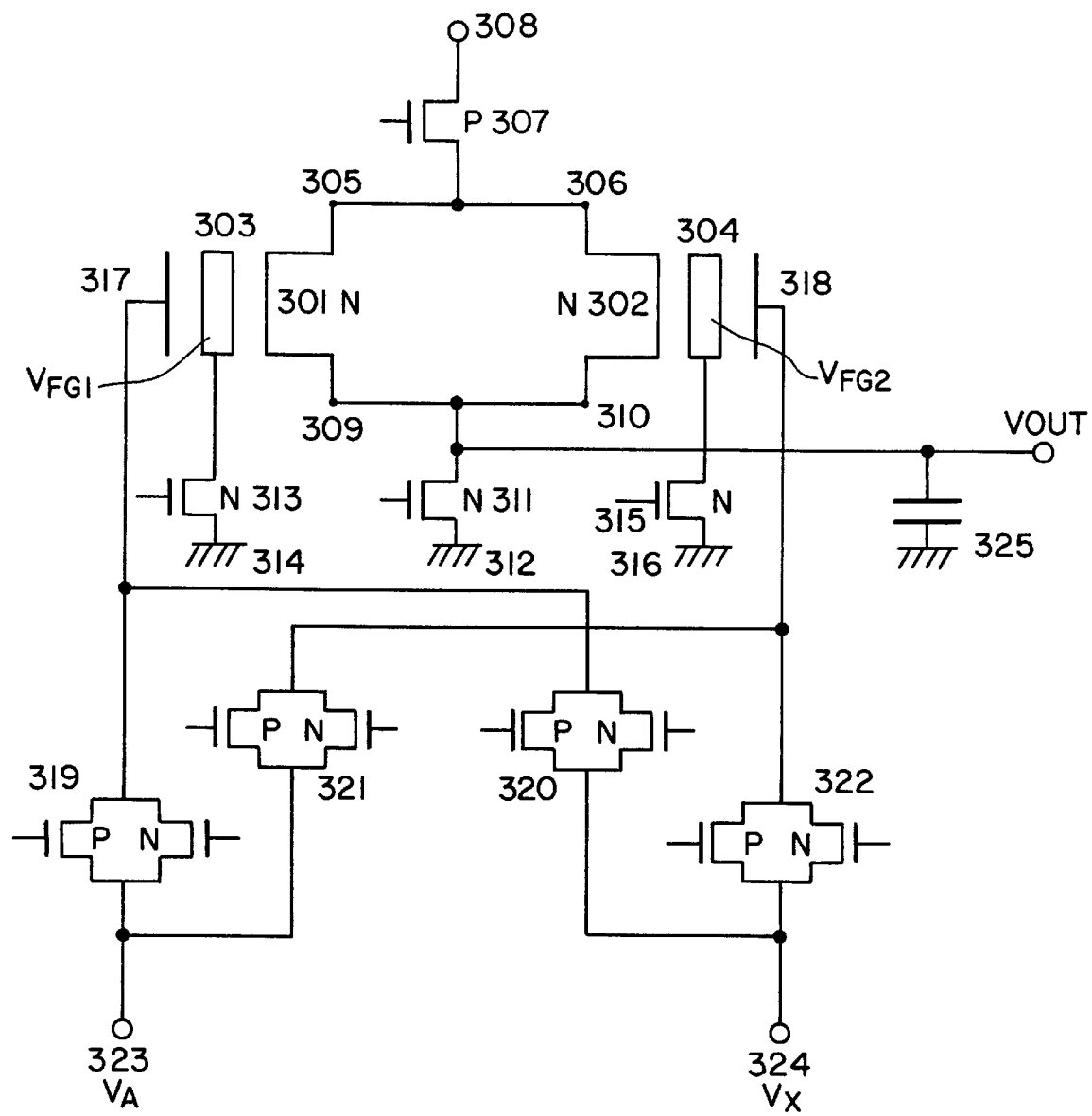
FIG. 3 is a circuit diagram showing an example of a comparison operation circuit to be used in the vector comparator in accordance with the present invention.

FIG. 3 shows a second preferred embodiment of the present invention; the structure of comparison operator to be used in the vector comparator 106 is realized using neuron MOS.

References 301 and 302 indicate NMOS transistors, while references 303 and 304 indicate gate electrodes formed from, for example, $N^+$ polysilicon; gate electrode 303 controls the ON/OFF state of NMOS transistor 301, while gate electrode 304 controls the ON/OFF state of NMOS transistor 302.

The drains 305 and 306 of NMOS 301 and 302 are connected to one another, and PMOS switch 307, for example, is interposed as a switching element, and this is connected to 5 V signal line 308. The sources 309 and 310 of NMOS 301 and 302 are connected to one another, and NMOS 311 is interposed as a switching element, and this is connected to a 0 V ground potential 312. The gate electrode 303 of NMOS 301 is connected to a 0 V ground potential 314 via, for example, NMOS 313 as a switching element; by means of employing NMOS 313 as a switching element, it is possible to set gate electrode 303 to a predetermined potential, and furthermore, by placing NMOS 313 in an OFF state, it is possible to place the gate electrode in an electrically floating state.

The gate electrode 304 of NMOS 302 is connected to 0 V ground potential 316 via, for example, NMOS 315 as a switching element; by means of using NMOS 315 as a switch, it is possible to set gate electrode 304 to a predetermined potential, and furthermore, by means of placing NMOS 315 in an OFF state, it is possible to place the gate electrode in an electrically floating state. The gate electrode 303 of NMOS transistor 301 is capacitively coupled with the input electrode 317, and the gate electrode 304 of NMOS transistor 302 is capacitively coupled with the input electrode 318.

Input electrode 317 is connected to input electrode 323, with a transmission gate 319 having, for example, a CMOS structure, as a switching element therebetween, and furthermore, this is connected to input electrode 324 with a transmission gate 320 having, for example, a CMOS structure, as a switching element therebetween. Input electrode 318 is connected to input electrode 323 with a transmission gate 321 having, for example, a CMOS structure, therebetween as a switching element, and input electrode 318 is furthermore connected to input electrode 324 with a transmission gate 322 having, for example, a CMOS structure, as a switching element therebetween. Here, CMOS structure transmission gates 319, 320, 321, and 322 are employed as switching elements for the purpose of connecting input electrodes 323 and 324 with input electrodes 317 and 318; however, these are employed only so that the semiconductor computing circuit can conduct accurate calculations, and there will be no change in the effects of the present invention if other switching elements are used in place of the CMOS structure transmission gates 319, 320, 321, and 322.

Furthermore, the sources 309 and 310 of NMOS transistors 301 and 302 are connected, for example, to an external capacitance load 325; this has a structure which is capable of reading out, as a source follower circuit, the higher of potential $V_{FG1}$. Of gate electrode 303 and potential $V_{FG2}$ of gate electrode 304 to the exterior as $V_{OUT}$. Here, $V_{OUT}$ is a voltage which is the larger Of $V_{FG1}-V_{TH1}$ and $V_{FG2}-V_{TH2}$; $V_{TH1}$ is the threshold voltage of NMOS 301 as viewed from gate electrode 303, while $V_{TH2}$ is threshold voltage of NMOS 302 as viewed from gate electrode 304. If setting is conducted so that, for example, $V_{TH1}=V_{TH2}=0$ V, $V_{OUT}$ will be a voltage which is the larger of $V_{FG1}$ and $V_{FG2}$. Here, for the purposes of simplicity, setting is conducted so that $V_{TH1}=V_{TH2}=0$ V, but there is no change in the effects of the present invention even if a value other 0 V is used.

The output potential $V_{OUT}$ is obtained here by setting NMOS transistor 311 to an OFF state. At this time, the output potential $V_{OUT}$ was 0 V when NMOS transistor 311 was in an ON state; however, by placing NMOS transistor 311 in an OFF state, the potential begins to rise from 0 V, the differences in potential between the gate electrodes and the sources of NMOS transistors 301 and 302 reach the threshold values, and $V_{OUT}$ increases until both NMOS transistors 301 and 302 enter an OFF state, so that as a result, the output potential $V_{OUT}$ is outputted as a voltage which is the higher of $V_{FG1}$ and $V_{FG2}$.

Here, the drains 305 and 306 of NMOS transistors 301 and 302 are connected to one another, with PMOS transistor 307 interposed therebetween as a switching element, and this is connected to the 5 V signal line 308; however, this is disposed in this manner in order to prevent the flowing of a current from the 5 V signal line 308 when NMOS transistor 312 is in ON state, and thus to suppress power consumption. Accordingly, the effects of the present invention will be unchanged even if a different switching element is employed in place of PMOS transistor 307.

Furthermore, a resistor or capacitor may be employed in place of the switching element PMOS transistor 307, and even if nothing is employed and the drains 305 and 307 of NMOS transistors 301 and 302 are directly connected to the 5 V signal line 308, there will be no change in the effects of the present invention. Additionally, it is not necessary that the drains 305 and 306 be connected to one another; no problems will be caused if these drains are separately connected to the 5 V signal line 308 using a mechanism such as that described above. Here, in order to simplify the circuit design, the drains 305 and 306 are connected to one another.

Next, the operation of the circuit will be discussed.

First, the potential ($V_A$) of the input electrode 323 is inputted, via the CMOS structure transmission gate 319, to the input electrode 317 which is capacitively coupled with the gate electrode 303 of NMOS transistor 301, and the potential ($V_X$) of input electrode 324 is inputted, via the CMOS structure transmission gate 322, into the input electrode 318 which is capacitively coupled with the gate electrode 304 of the NMOS transistor 302. At this time, by means of making the NMOS transistors 313 and 314 conductive, the gate electrodes 303 and 304 are set equal, for example, to the 0 V ground potential. Next, before the currently conducting switching elements 319 and 322 are cut off, the currently conducting NMOS transistor switching elements 313 and 315 are cut off, and gate electrodes 303 and 304 are placed in an electrically floating state.

After this, the conducting switching elements 319 and 322 are cut off, and then the switching elements 320 and 321 are caused to conduct, and the potential of input electrode 323 is inputted into input electrode 318, while the potential of input electrode 324 is inputted into electrode 317. That is to say, at first, gate electrodes 303 and 304 are set equal to the ground potential, and the potential of input electrodes 323 and 324 are inputted into, respectively, input electrodes 317 and 318.

Next, after gate electrodes 303 and 304 have been placed in an electrically floating state, the potentials of input electrodes 323 and 324 are replaced with those of the initial state, and these potentials are inputted into, respectively, input electrodes 318 and 317. Here, the potential of input electrode 323 is first inputted into input electrode 317, and then the potential of input electrode 324 is inputted into input electrode 318. However, it is of course the case that there will be no change if the order of input into the input electrodes 317 and 318 is reversed. This is because the essence of the operation of this circuit lies in the replacement of the inputs in the first stage and second stage during input into input electrodes 317 and 318.

After the inputs have been replaced, the potential of gate electrode 303 becomes $V_X$-$V_A$, and the potential of gate electrode 304 becomes $V_A$-$V_X$. This is because, since the gate electrodes 303 and 304 are in an electrically floating state prior to the replacement of the inputs, when the inputs are replaced, the gate electrodes 303 and 304 are raised by only the difference between the potential which was originally inputted and the potential which was subsequently inputted. By means of this, the potential has a value of the difference between the inputs.

With respect to the output operation, as described above, since NMOS transistor 311 is in an OFF state, the larger of the potential ($V_X$-$V_A$) of gate electrode 303 and potential ($V_A$-$V_X$) of gate electrode 304 is outputted. By means of this, the differences between inputs are obtained, and the larger of the values among the results thereof can be outputted, so that it is possible to determine the maximum value. The final output result $V_{OUT}$ can be expressed by the formula $|V_A$-$V_X|$.

Here, the case will be considered in which, for example, the potential $V_A$ of input electrode 323 is 4 V, while the potential $V_X$ of input electrode 324 is 1 V. First, the switching element 319 is made to conduct and by means of this the 4 V potential of the input electrode 323 is inputted into input electrode 317, and furthermore, the switching element 322 is made to conduct and thereby the 1 V potential of the input electrode 324 is inputted into input electrode 318. At this time, gate electrodes 303 and 304 are set so as to be equal to the ground potential 0 V by means of causing the NMOS transistors 313 and 315, respectively, to conduct.

After the passage of 30 nsec, NMOS transistors 313 and 315 are cut off, the gate electrodes 303 and 304 are placed in an electrically floating state, and the gate electrodes 303 and 304 are thus maintained at the ground potential of 0 V. Then, after the passage of 2 nsec, the switching elements 319 and 322 are placed in an OFF state, and the switching elements 320 and 321 are placed in an ON state, so that the 4 V potential of the input electrode 323 is inputted into input electrode 318, while the 1 V potential of the input electrode 324 is inputted into input electrode 317.

At this time, a potential of 1 V is inputted into the gate electrode 303, into which a potential of 4 V was originally inputted, and thereby, the potential of gate electrode 303 is reduced by the difference therebetween of 3 V, and becomes −3 V. However, in actuality, the PN junctions comprising NMOS transistor 313 are subjected to a forward bias, so that the potential can only fall from 0 V by the amount of the built-in potential, and this presents no problems in the circuitry. A 4 V potential is subsequently inputted into the gate electrode 304, into which a potential of 1 V was originally inputted, and thereby, the potential of gate electrode 304 is increased by the difference of 3 V therebetween, and becomes 3 V.

Finally, in the course of the output operation, NMOS transistor 311 is placed in an OFF state, and PMOS transistor 307 is placed in an ON state, and thereby NMOS transistors 301 and 302 operate as a source follower circuit, and the 3 V potential of gate electrode 304, which maintains the larger of the potentials of the gate electrodes 303 and 304, is outputted.

Figure 4:
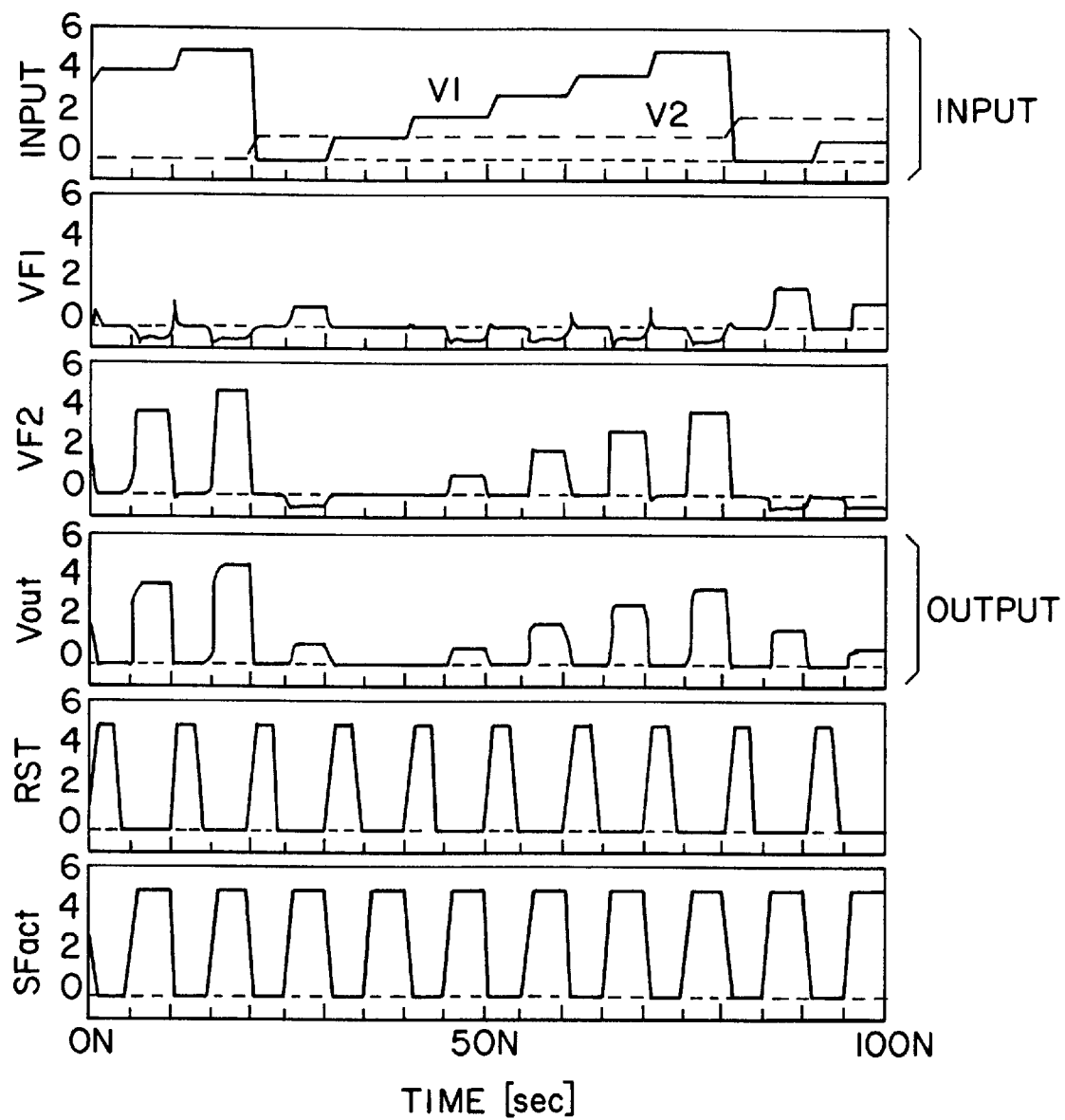
FIG. 4 is a graph showing the operation of the comparison operation circuit.

With respect to this example, a simulation was conducted using circuit simulation (brand name: HSPICE simulation). The results thereof are shown in FIG. 4. In FIG. 4, the example is shown in which the input voltages applied to input electrodes 323 and 324 were 4 V and 1 V; however, cases having other values were simultaneously simulated. It is clear from FIG. 4 that the operation was correct with respect to all examples.

In this concrete example, a potential of 4 V was used as the potential of input electrode 323, while a potential of 1 V was used as the potential of input electrode 324; however, it is of course the case that it is possible to conduct calculations using freely selected analog values.

Here, NMOS transistors 311, 313, and 315 were employed as switching elements; however, no problems will be occasioned if, in place of these transistors, other switching elements are employed, such as, for example, PMOS transistors, or transmission gates having a CMOS structure or the like. Furthermore, NMOS transistor 311 is employed as a switching element; however, no problems will be caused if a resistor or capacitor or the like is employed in place of this switching element. Additionally, 0 V was employed as the ground potential 312 for the purpose of facilitating circuit design; however, the effects of the present invention will be unchanged even if a ground potential other than 0 V is employed.

As described above, in the present invention, by replacing the inputs, and by attaching switching elements 313 and 315 to gate electrodes 303 and 304 and setting gate electrodes 303 and 304 so as to be equal to the ground potential and placing these electrodes in an electrically floating state, it is possible to obtain the difference between the inputted data, and furthermore, it is possible to extract the largest value among the results of these differences, so that a circuit is realized in which the absolute value of the difference between the inputted data can be ultimately calculated in real time and with a high degree of accuracy.

Figure 5:
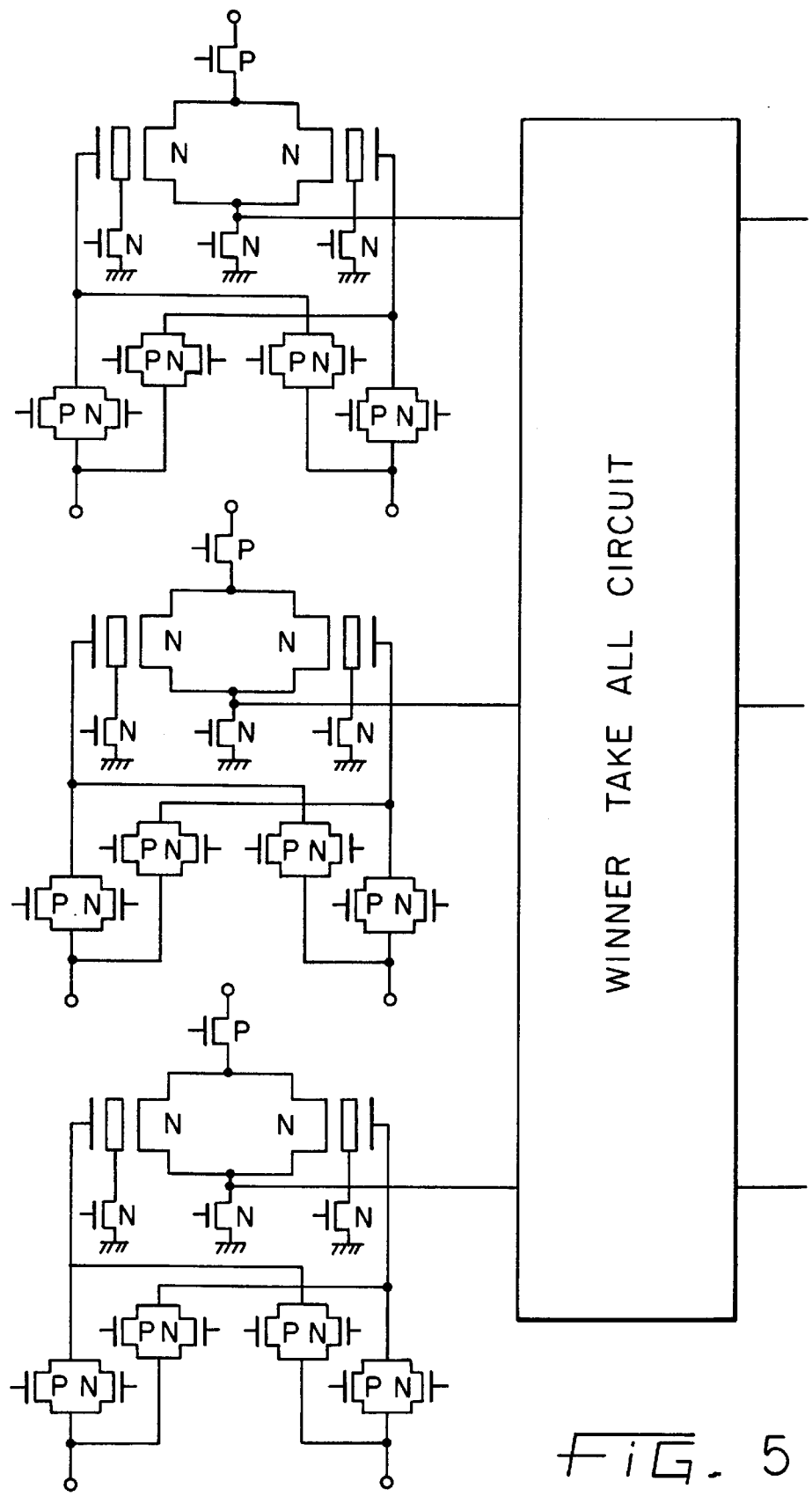
FIG. 5 is a circuit which selects the smallest value among the operational results of the comparison operation circuits.

FIG. 5 shows a circuit in which a plurality of difference absolute value circuits such as, for example, those discussed in the present embodiment are aligned in parallel, the outputs thereof are inputted into input terminals of a winner-take-all circuit, and thereby, it is possible to calculate the closest values among the calculation results of the difference absolute value circuits.

By means of combining the winner-take-all circuit with the difference absolute value circuits, it is possible to calculate at high speed and with a high degree of accuracy which data among a large amount of data which have been stored up to the present time are closest to inputted data.

Furthermore, here, a circuit structure is shown in which 3 different absolute value circuits are combined with a 3 input winner-take-all circuit; however, it is of course the case that no problems will be caused no matter how many difference absolute value circuits are employed, so long as a winner-take-all circuit having this number of inputs is combined with the difference absolute value circuits. It is of course the case that winner-take-all circuits other than those of the present embodiment may be employed in so far as they have the same function. The winner-take-all circuit disclosed in, for example, Japanese Patent Application No. Hei 4-222166 may be employed.

(Preferred Embodiment 3)

Figure 6:
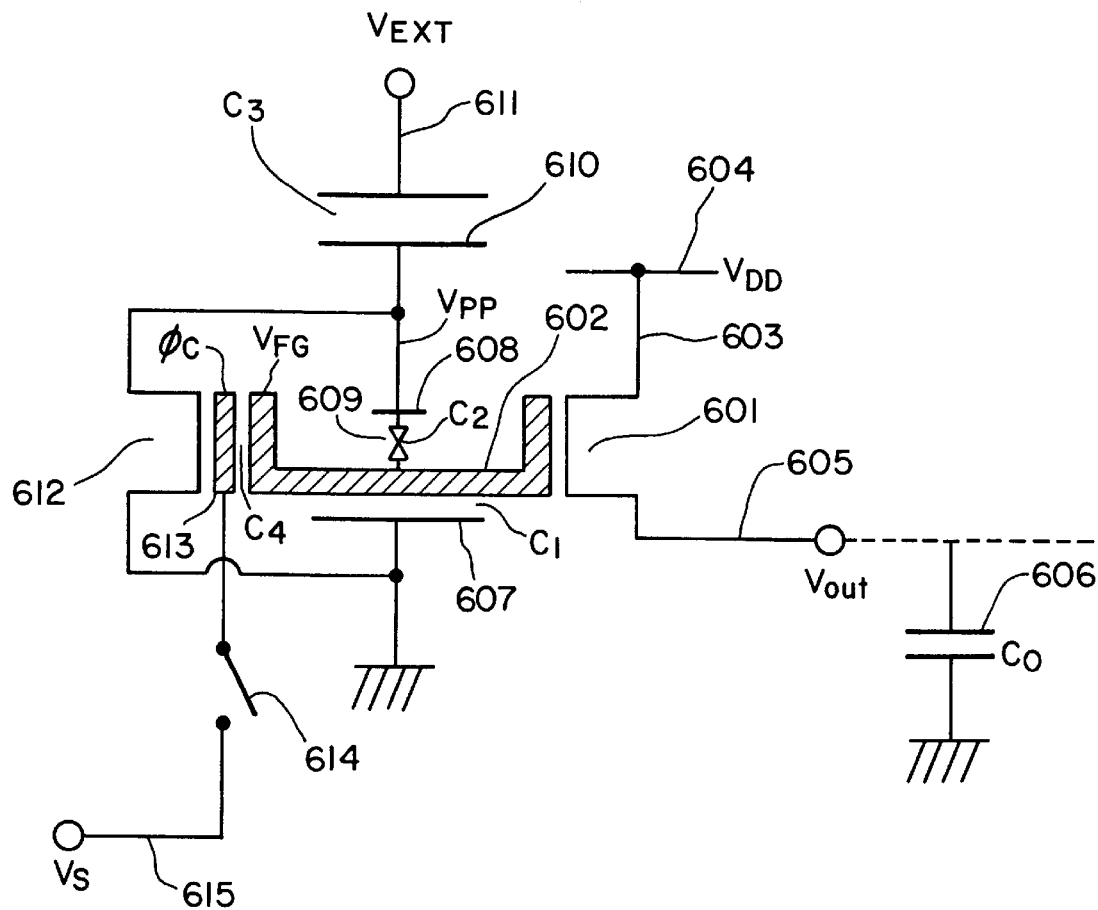
FIG. 6 is a circuit diagram showing an example of a large scale memory circuit. (Single memory element)
Figure 8:
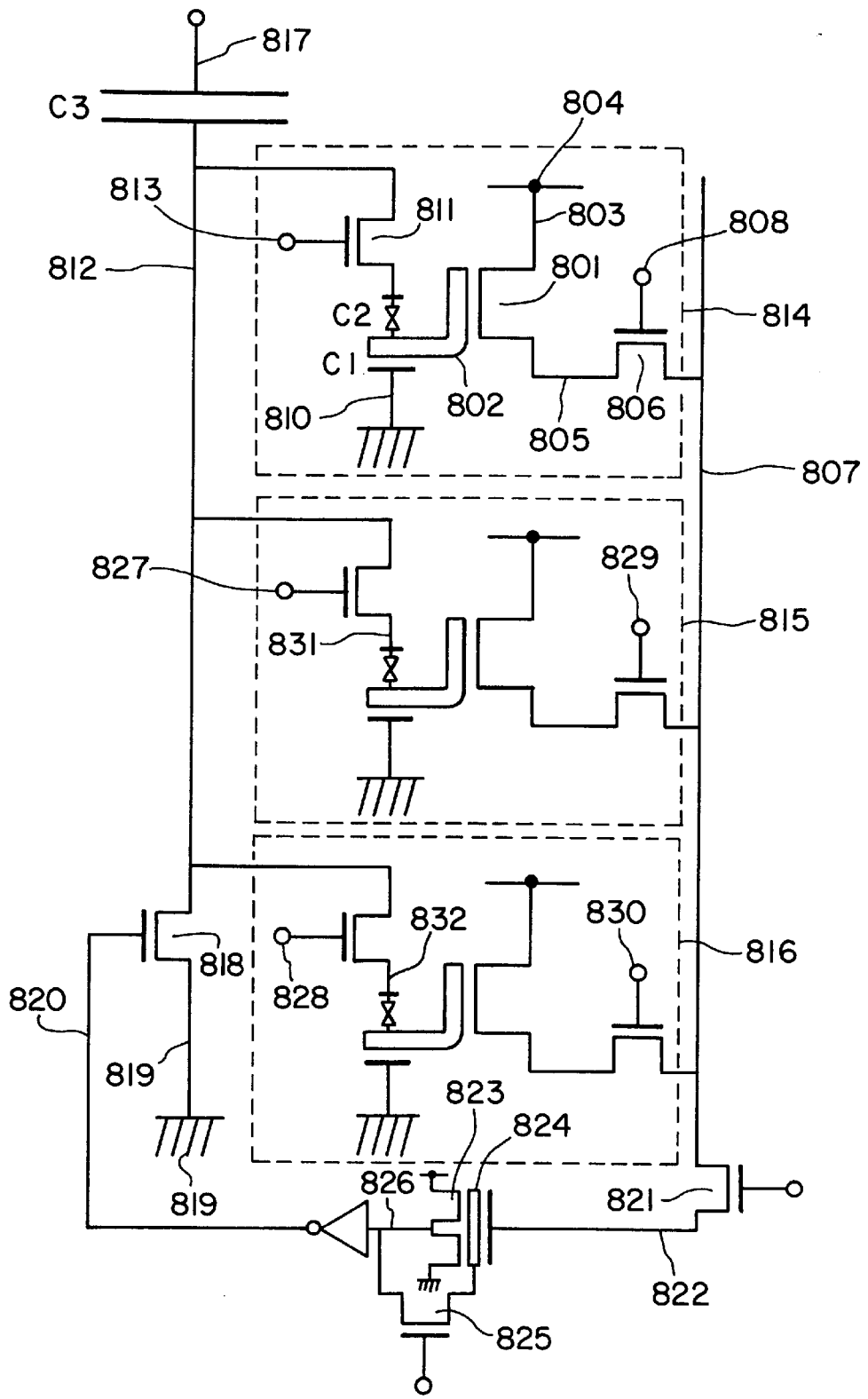
FIG. 8 is a circuit diagram showing another example of a large scale memory circuit. (Three memory elements are shown.)

FIG. 6 and 8 depict a third embodiment of the present invention; they refer to the structure of large scale memory 107. That is to say, this memory is one into which predetermined analog or predetermined variables are accurately written, and which stores and maintains these variables in a non-volatile manner.

In FIG. 6, reference 601 indicates a NMOS transistor, while reference 602 indicates a floating gate electrode formed from, for example, N$^+$ polysilicon; this controls the ON/OFF state of NMOS 601. The drain 603 of the NMOS is connected to a power source line 604, and the source 605 is connected to, for example, an external capacity load 606, and the structure is one which reads out the potential $V_{FG}$ of the floating gate 602 to the exterior as $V_{OUT}$ in the manner of a source follower circuit. Here, $V_{OUT}=V_{FG}-V_{TH}$, where $V_{TH}$ is the threshold voltage of NMOS 601 as seen from the floating gate. If $V_{TH}=0$, for example, is Set, then $V_{OUT}=V_{FG}$ results. Here, for the purposes of simplicity, $V_{TH}$ is set equal to 0; however, there is no change in the effect of the present invention if a value other than 0 is employed. $V_{TH}$ has a constant value which is determined during manufacturing; this is so that the voltage $V_{FG}$ and charge $Q_F$ of the floating gate may be determined in consideration of this. Since $V_{FG}$ may be expressed as $Q_F/C_{TOT}$ (where $Q_F$ is the charge of the floating gate 602, and $C_{TOT}$ is the sum of the capacities connected to floating gate 602), then by means of:

$$V_{OUT}=Q_F/C_{TOT} \qquad (1)$$

it is possible to read out the contents of the memory to the exterior. Reference 607 indicates an electrode which is capacitively coupled with the floating gate 602; in this example, it is grounded. The capacitive coupling coefficient thereof is represented by $C_1$. Reference 608 indicates a charge implantation electrode which is connected with the floating gate via a tunnel junction 609. It is possible to form this tunnel junction by subjecting the surface of a floating gate formed, for example, from N$^+$ polysilicon to thermal oxidation, thus forming a 10 nm oxide film, and then placing a gate electrode 608 formed from, for example, N$^+$ polysilicon, on top of this. However, this is only one example of the structure of the tunnel junction, and it is of course the case that various other materials and methods may be employed. The capacity of the tunnel junction 609 is expressed by $C_2$. The charge implantation electrode 608 is connected to a programming voltage ($V_{EXT}$) application terminal 611 via capacity 610 (the size of which is designated by $C_3$). Reference 612 indicates a NMOS transistor, the ON/OFF state of which is controlled by means of floating gate 613. Floating gate 613 is connected with a floating gate 615 via switch 614, so that when 614 is in an ON state, the potential thereof is fixed at the potential $V_S$ of the signal line 615, while when switch 614 is in an OFF state, the floating gate is in a floating state, and the potential thereof is determined by the potential of floating gate 602 and the capacitive coupling coefficient therewith (the capacitive coupling coefficient between floating gate 602 and floating gate 613 is designated by $C_4$).

Next, the operation of the circuit will be explained. The case will be considered in which the data $V_{FG}=V_M$ is written into floating gate 602. That is to say, a charge of $Q_{FG}=C_{TOT}V_M$ is implanted in the floating gate 602. This is accomplished by means of the following methods.

First, $V_S$ is set equal to $-V_M$, switch 614 is placed in an ON state, and the potential $\Phi_C$ of floating gate 613 is set equal to $-V_M$. Next, when switch 614 is placed in an OFF state, a charge of $Q_C=-C_4V_M$ is stored in floating gate 613. (Here, for the purposes of simplicity, it will be assumed that the total capacity of floating gate 613 is equal to $C_4$.) If the threshold voltage of NMOS 612 as seen from floating gate 613 is set to 0 V, then NMOS 612 is in an OFF state at this time, and electrodes 607 and 608 are electrically isolated from one another.

In this state, when a voltage of $V_{EXT}=25$ V is applied to terminal 611 as a programming voltage, then a voltage $V_T$ which is given by the following formula is applied to both ends of the tunnel junction 609 as a result of capacity division.

$$V_T=(1/C_2) V_{EXT}/ (1/C_1+1/C_2+1/C_3) \qquad (2)$$

Figure 7:
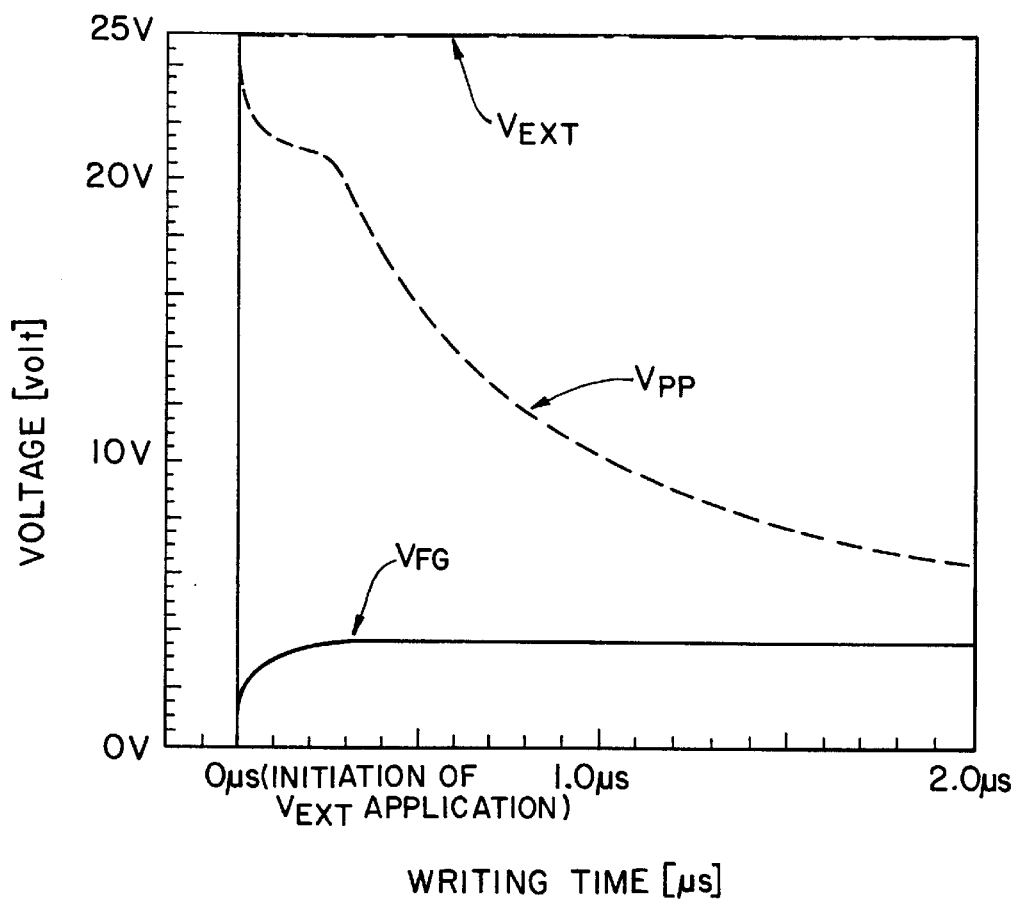
FIG. 7 is a graph showing the operation of the large scale memory circuit of FIG. 6. (Single memory element)

Now, if $C_2 \ll C_1$, $C_3$, then $V_T=V_{EXT}$ results, a large electric field is generated in the tunnel junction 609, and a current is caused to flow, and electrons move from floating gate 602 to charge implantation electrode 608. As a result, $V_{FG}$ has a positive value and becomes large. The changes at this time were determined by HSPICE simulation, and the results thereof are shown in FIG. 7. It can be seen that $V_{FG}$ increases with time, and $V_{PP}$ diminishes from t=0, at which time $V_{PP}=25$ V, so that charge transfer occurs.

Since $V_{FG}$ increases, the potential of floating gate 613 also increases as a result of capacitive coupling, and the value thereof can be expressed by the following formula:

$$\Phi_C=(C_4V_{FG}+Q_C)/C_4=V_{FG}-V_M \qquad (3)$$

That is to say, as $V_{FG}$ increases and reaches the point at which $V_{FG}$ is greater than or equal to $V_M$, then $\Phi_C$ is greater than or equal to 0, and the threshold value 0 V of NMOS 612 is exceeded, so that NMOS 612 enters an ON state. When this occurs, electrodes 607 and 608 are electrically connected via NMOS 612, so that the positive charge of electrode 608 flows to the ground, and $V_{PP}$ rapidly diminishes. As a result, $V_T$ is reduced and tunnel current ceases to flow, so that $V_{FG}$ attains a stable value. That is to say, a value of $V_{FG}=V_M$ is programmed.

In FIG. 7, $V_M=+4.0$ V is set. It can be seen that approximately 1.2 μsec after pulse application, $V_{FG}$ reaches a stable value (approximately 3.5 V). Since in conventional examples this required a long period of time which was measured in seconds, it can be seen that the writing time is dramatically reduced. Here, there a difference of approximately 0.5 V between the desired value $V_M$ of the writing and the actual convergence value of $V_{FG}$; however, if the value of $V_M$ is set in advance in consideration of this difference, it is possible to conduct accurate control.

As described above, in the circuit of the present invention charge implantation is generated in floating gate 602, and a function is realized by which $V_{FG}$, which changes as a result of the implantation, is continuously monitored in real time, and implantation is concluded automatically when $V_{FG}$ reaches a predetermined value; the predetermined value can thus be written at extremely high speed.

In the above, the explanation assumed that $C_2 \ll C_1 C_3$; however, the circuit is not limited to such conditions. The condition $C_2 \ll C_3$ is only necessary so that $V_T$ is as close as possible to $V_{EXT}$, so that if the necessary electric field value is obtained, for example, by making $V_{EXT}$ large, or by making the tunnel oxide film thin or the like and thus increasing the size of the electric field in the tunnel implantation part, this condition becomes completely unnecessary. The condition that $C_2 \ll C_1$ was established so that, in addition to the reasons mentioned above, the increase effect in the floating gate 602 as a result of the voltage during the application of $V_{EXT}$ could be ignored. For example, if a value of $V_{EXT}=25$ V is applied, then by means of the capacitive coupling of $C_1$, $C_2$, and $C_3$, the potential $\Phi_{FG}$ of the floating gate with respect to the terminal 607 is increased in the following manner by $V_{EXT}$:

$$V_{FG}=(1/C_2)V_{EXT}/(1/C_1+1/C_2+1/C_3) \qquad (4)$$

If $C_2 \ll C_1$, then as described above, $\Phi_{FG}$ will become essentially equivalent to 0. Even is $C_2$ is not so small in comparison with $C_1$ that it can be safely ignored, $\Phi_{FG}$ is determined by values the of $C_1$, $C_2$, $C_3$, and $V_{EXT}$, which are known in advance, so that by setting the data to be written in anticipation of these values, it is possible to conduct control which is completely identical in the case in which $C_2 \ll C_1$, $C_3$. The concrete effect when $\Phi_{FG}$ can not be ignored can be expressed by replacing $V_{FG}$ in Formula (3) with $V_{FG}+\Phi_{FG}$. That is to say, writing stops when $\Phi_C=V_{FG}+\Phi_{FG}-V_M=0$, so that the data $V_{FG}=V_M-\Phi_{FG}$ is written into floating gate 602. That is to say, a value smaller by a predetermined amount than the value $V_M$ which was set is written. If control was conducted so that data which are increased by the amount of $\Phi_{FG}$ are written, then identical control can be conducted.

By employing a source follower circuit using NMOS 601 (the threshold voltage $V_{TH}$ as seen from the floating gate 602 whereof is, for example, 0 V) when reading out the data which were written in, it is possible to read out the voltage of floating gate 602 directly as an analog voltage where $V_{OUT}=V_{FG}$. It is not necessary that the threshold voltage $V_{TH}$ of the NMOS 601 above have a value of 0 V; when $V_{TH}$ has a limited value, the analog data $V_{OUT}=V_{FG}-V_{TH}$ are read out.

Furthermore, in the example of FIG. 6, the case was exhibited in which a capacity ($C_0$) was employed as the load element of the source follower; however, this is not necessarily so limited, and a resistor may be employed, or a load element constructed using MOS transistors may be employed.

Furthermore, a plurality of memory cells are arranged in a matrix form, and in order to selectively read out the data of a predetermined cell, the power source line 604 may be selectively raised to $V_{DD}$ and thereby, only the source follower connected to the power source line is activated and readout is conducted, or alternatively, power source line 604 may be kept at a constant voltage of $V_{DD}$, and MOS transistors for selection may be disposed at each cell at $V_{OUT}$ terminal 605.

In the above example, it was necessary to apply the negative value $-V_M$ as $V_S$ in order to conduct the writing of the $V_M$ value; however, the following procedure may be employed in order to avoid the generation of a negative signal.

If the threshold value NMOS 612 is set to $V_{TH}'$, then from FIG. (3), the conditions under which this NMOS enters an ON state are:

$$F_C=V_{FG}+V_S > V_{TH}' \qquad (5)$$

That is to say, $V_S > V_{TH}'-V_{FG}$, so that in order to write $V_{FG}$ into the gate, the following must be set:

$$V_S > V_{TH}'-V_{FG} \qquad (6)$$

Here, if $V_{TH}$ is set equal to 5 V, then in order to write values of 0, 1, 2, 3, and 4 (V) as $V_{FG}$, $V_S$ is set equal to 5, 4, 3, 2, 1 (V), respectively, and the voltages for writing control to which $V_S$ must be set are all positive potentials, and it is not necessary to generate negative signals.

In the circuitry of FIG. 6, a different method may be employed as the setting method for the writing data. This can be explained as follows. First, after switch 614 has been placed in an ON state, $V_S$ is set to 0 V, and the potential of electrode 607 is set to $V_M$. Now, if $C_1 \ll C_2$ is established, then $V_{FG}=V_M$ results. After this, when switch 614 is placed in an OFF state, a charge of $Q_C=-C_4 V_M$ is stored in floating gate 613. When writing commences, $\Phi_C$ changes in accordance with Formula (3), so that if the threshold value of NMOS 612 is set to, for example, 0 V, then when $\Phi_C=0$, that is to say, $V_{FG}=V_M$ is reached, NMOS 612 enters an ON state, and charge implantation into floating gate 602 ends. If this method is employed, it is possible to employ a nonnegative writing control voltage even without setting the threshold voltage of NMOS 612 to an especially high level.

Furthermore, the threshold voltage of NMOS 612 may be set to a limited value rather than 0 V, and at this time a value of $V_M-V_{TH}'$ is written into floating gate 602. Alternatively, if $V_S=V_{TH}'$ is established when switch 614 is placed in an ON state and a potential of electrode 607 is set to $V_M$, then a value of $V_M$ will be written in an unchanged manner into floating gate 602.

It is of course the case that there will be no change in the effect of the present invention if any of the data setting methods are employed.

The foregoing explanation was applied only to the case in which, in the state prior to the first application of a programming voltage ($V_{EXT}$) to the programming voltage application terminal 111, there was absolutely no charge present in the floating gate 602. That is to say, the writing method which was initially described is only accurate in the case in which, when a charge was set in floating gate 613 as $V_S=-V_M$, $V_{FG}$ was equal to 0 V. If at this time a charge existed in floating gate 602, and $V_{FG}=V_{FGO}\ne 0$, then when the voltage for writing control was set in floating gate 613 as $V_S=-V_M$ and a programming voltage was applied to $V_{EXT}$, the control transistor 612 would enter an ON state for the first time when $V_{FG}$ had risen to the level of $V_M+V_{FGO}$, and a voltage of $V_M+V_{FGO}$ would be written into floating gate 602. Accordingly, in the case in which a charge preexisted, $V_{FGO}$ could be read out in advance using the source follower operation of NMOS 601, and the setting of the value $V_S$ could be conducted in consideration of the effect of $V_{FGO}$, that is to say, $V_S$ could be set equal to $-(V_M-V_{FGO})$. By proceeding in this manner, it is possible to write a value of $V_{FG}=V_M$ even if a charge was initially present.

Next, various methods will be explained for the rewriting of data after the writing of data into the floating gate.

The setting of $V_{FG}=0$, that is to say, the setting of the charge of the floating gate 602 to 0, is a simple matter; this may be accomplished by irradiation with UV light in the state in which the potential of electrode 607 is 0.

A method may be employed for the erasure of data electrically stored in the floating gate in which, for example, a negative voltage is applied as $V_{EXT}$, and electrons are implanted in the floating electrode. Alternatively, a method may also be employed in which a positive potential is applied to electrode 607 in a state in which the programming voltage application terminal 611 is grounded, and electrons are implanted in the floating gate. A further method may be employed in which tunnel junction parts for electron implantation are specially provided in addition to tunnel junction parts 609, and a number of cells are erased as a group. Furthermore, a method may be employed in which, in FIG. 6, the power source line 604 is set to a voltage larger than $V_{DD}$ in the state in which $V_{OUT}$ terminal 605 is reset to 0 V, hot electrons are generated at the drain terminal of NMOS 601 and by means of the implantation of these hot electrons into floating gate 602, the positive charge is cancelled. At this time, by setting electrode 607 to a variety of potentials, it is possible to control the amount of implantation. In an alternative method for the implantation of hot electrons into the floating gate, even if transistor 601 is not employed, a dedicated short channel transistor for implantation, which facilities the generation of hot electrons, may be specially provided, and the gate electrode thereof may be used in concert with the floating gate. The various electrical methods described above possess the disadvantage that they may reduce the charge within the common floating gate 602 not to 0, but to a negative value, so that it is necessary to read out the amount of charge using a source follower operation and to adjust $V_S$ or the voltage applied to electrode 607 in consideration of this amount of charge.

In the foregoing, various data update methods were discussed; however, it is of course the case that any of the methods may be employed. Furthermore, in FIG. 8, reference 801 indicates a NMOS transistor, while reference 802 indicates a floating gate electrode formed from, for example, $N^+$ polysilicon; this controls the ON/OFF state of NMOS 801. The drain 803 of the NMOS is connected to a power source line 804, while the source 805 is connected to the drain of an NMOS transistor 806, and the source of transistor 806 is connected to a common reading voltage line 807. Electrode 808 forms the gate electrode of transistor 806. The threshold voltage of this transistor 806 is set to $V_{FG1}$, and this is termed the reading selection transistor.

Reference 810 indicates an electrode which is capacitively coupled with the floating gate; the capacitive coefficient thereof is $C_1$, and the potential thereof is set to the ground potential. Reference 811 indicates an NMOS transistor; the source electrode thereof is capacitively coupled with floating gate 802 via a tunnel oxide film, and the capacitive coefficient thereof is represented by $C_2$. The drain of transistor 811 is connected with a common writing voltage generating line 812, and reference 813 indicates the gate electrode of transistor 811. The threshold voltage of this transistor 811 is represented by $V_{FG2}$, and this transistor will be termed the writing selection transistor. The structures describe above form a single memory cell, and serve to store a single analog value. In the Figure, the various cells are indicated by references 814, 815, and 816.

In this manner a plurality of identically functioning memory cells are arranged, and the structure is such that the source electrode of the reading selection transistor of each cell is connected with the common reading voltage line 807. Furthermore, the drain of the writing selection transistor of each cell is connected with the common writing voltage generating line 812. Reference 817 indicates an electrode which is capacitively coupled with common writing voltage generating line 812, and the capacitive coupling coefficient thereof is represented by $C_3$. Additionally, the common writing voltage generating line 812 is connected with drain of a normally-OFF type NMOS transistor 818, and the source electrode 819 of transistor 818 is grounded. Furthermore, this has a gate electrode 820, and the threshold voltage thereof is set to $V_{FG3}$. Voltage line 807 is connected with an input electrode 822 of the control circuit via an NMOS transistor 821. The input electrode 822 is capacitively coupled with the input 824 of an inverter 823, and furthermore, the input 824 is connected with the output 826 of inverter 823 via NMOS transistor 825. The output thereof is connected with the gate electrode 820 of transistor 818 via another inverter.

Here, all transistors are of an N channel type; however, it is of course the case that there will be no change in the effects of the circuit even if the designated transistors are replaced by P channel type MOS transistors, and furthermore, in FIG. 8, 3 memory cells were arranged to form a single block; however, this was only done so that the drawing might fit on the page, and it is of course the case that similar circuit effects may be obtained if any number of two or more of such cells are arranged. Additionally, in order to facilitate the explanation, the gate electrodes of the writing selection transistors and the gate electrodes of the reading selection transistors of the memory cells to which numbers were not assigned are designated with the references 827, 828, 829, and 830, respectively, and the tunnel junctions are designated 831 and 832. Electrodes 810 and 819 are set to the ground potential; however, this value is not necessarily so limited, and may be set to freely selected values, which are then used as a standard to adjust the other voltages.

Next, the operating principle of the circuit will be explained. Here, a voltage $V_{TAR}$ will be written into solely into the memory cell 814.

First, a voltage $V_{REF}$ is inputted as a reference voltage into a single externally provided control circuit. After this, transistor 825 is placed in an ON state, and is then placed in an OFF state. When this is accomplished, the circuit stores the reference voltage, and when a value equal to the reference value is subsequently inputted, a power source voltage is outputted to gate 820. This value $V_{REF}$ is a value which is outputted if a value of only $V_{TAR}$ is written into the memory cell during writing, and this value represents the addition of an offset voltage to $V_{TAR}$. This offset value is determined by the design, so that it is a simple matter to calculate $V_{REF}$ from $V_{TAR}$. Furthermore, a value greater than threshold voltage $V_{FG1}$ is applied to electrode 808, while a value less than threshold voltage $V_{FG1}$ is applied to electrodes 829 and 830. By doing this, it is possible to read out to the common reading voltage line 807 only the contents of the memory cell into which writing is conducted.

A value greater than threshold voltage $V_{FG2}$ is inputted into electrode 813, while a value less than threshold voltage $V_{FG2}$ is inputted into electrodes 827 and 828. Furthermore, the potential of the common writing voltage generating line 812 is set in advance to the ground potential. By proceeding in this manner, a charge is stored such that the tunnel implantation electrodes 831 and 832 of memory cells 815 and 816 are constantly kept at the ground potential, and subsequently, even if the potential of the common writing voltage generating line 812 changes, the potential of electrodes 831 and 832 will not change.

Next, after transistor 821 has been made to conduct, a sufficiently high voltage is applied to electrode 817. This value is high enough to permit a sufficient current to flow to the tunnel junction of the memory cell during writing. By doing this, a current flows to the tunnel junction of the memory cell 814, electrons are withdrawn from the floating gate 802, and the voltage of the floating gate continues to increase. This voltage value is read out to the input 822 of the control circuit from transistor 801, which has a source follower structure, via the reading selection transistor. During the process of writing into the cell, the state of the other memory cells is such that, since a value less than $V_{FG2}$ is applied to electrodes 827 and 828, the writing selection transistors are in an OFF state, and the tunnel implantation electrodes are in their previous state, that is to say, they maintain the ground potential. In other words, even if writing is conducted into memory cell 814, no writing is conducted in cells 815 and 816. It can be seen from this that writing is selectively conducted. When writing has been conducted for a certain period and $V_{TAR}$ is written in, the memory cell outputs a value of $V_{REF}$.

The values are monitored by the control circuit in a non-periodic fashion, and when $V_{REF}$ is outputted, the control circuit outputs the power source voltage, and a voltage greater than the threshold voltage is applied to gate electrode 820. When this is done, the transistor 818 enters an ON state, and the common writing voltage generating line is discharged and acquires the ground potential. At this point, writing ceases.

Furthermore, selectivity during reading may be easily realized by means of the control of the ON/OFF state of each reading selection transistor.

The effects of using such a circuit structure are clear. Conventionally, the condition also existed that capacity $C_3$ needed to be larger than capacities $C_1$ and $C_2$; however, by means of providing only one capacity $C_3$ per block, and using in place of this a writing selection transistor for each cell, it is possible to realize a great increase in the degree of integration without adversely affecting selectivity during writing or reading. The number of transistors is also the same as in conventional examples; there are 3 transistors per cell.

Furthermore, in the present embodiment, a circuit having a switch which short circuits the output and input of the inverter is employed as the control circuit; however, the effects of the present invention will be unchanged if other control circuits which were conventionally employed are used. The reason for this is that the effects of the present invention reside in the large scale integration of elements having a plurality of cells by means of common elements, not in the structure of the control circuit.

(Preferred Embodiment 4)

Figure 9:
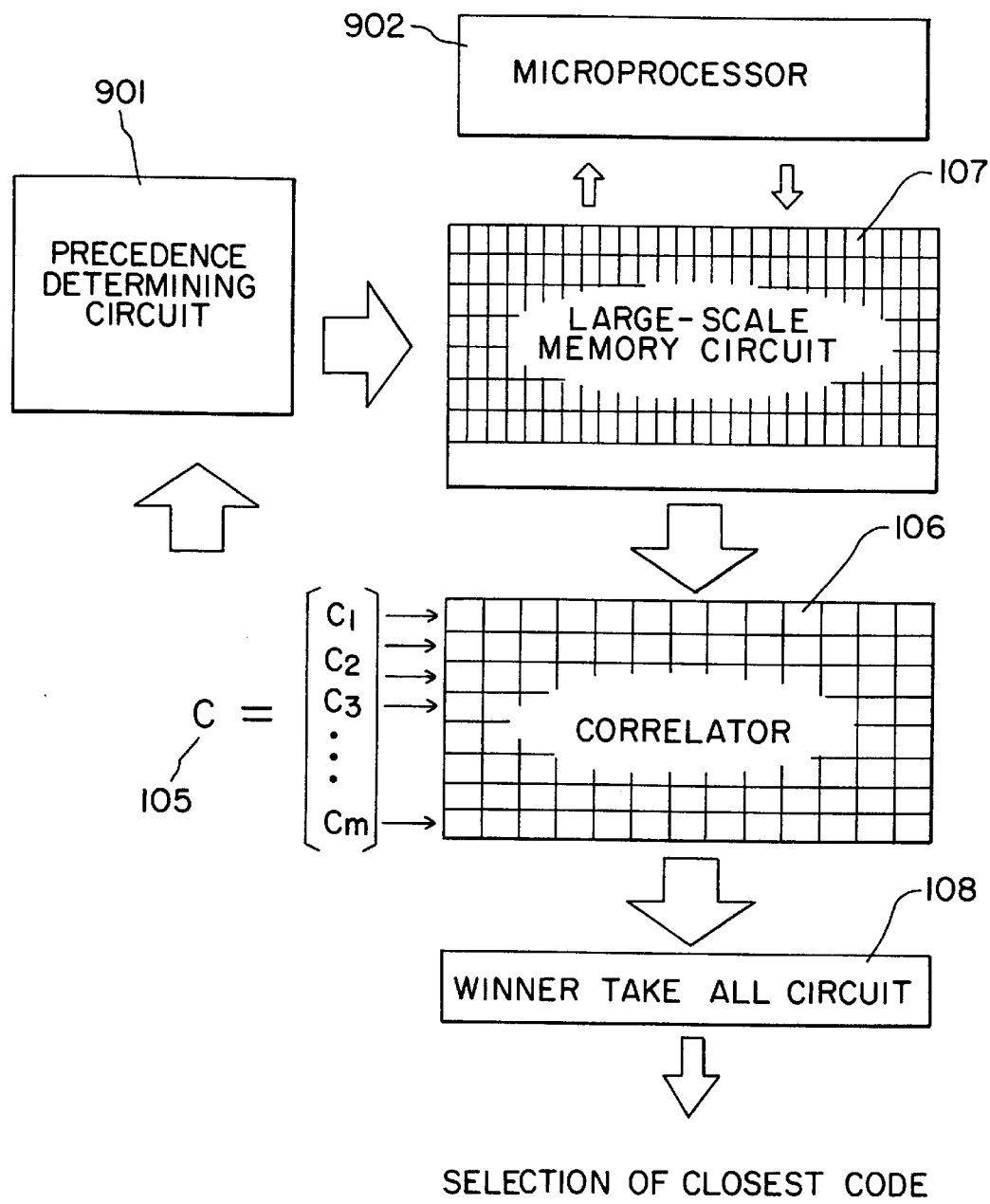
FIG. 9 is a conceptual diagram showing another example of the structure of the present invention.

FIG. 9 is a block diagram showing a fourth embodiment of the present invention; the basic structure is identical to that of FIG. 1. The difference lies in the addition of a new precedence determining circuit 901. In the Figure, identical reference numbers are given to functional blocks identical to those in FIG. 1. Precedence determining circuit 901 accepts a characteristic vector as an input, and determines with which group of data within large scale memory 107 comparison should begin. That is to say, a determination is made from the value of the characteristic vector as to which block has the highest proportion of candidates, this is initially downloaded to correlator 106, and the search is begun.

This may be accomplished in the following manner. In the example shown in FIG. 2, if faces having a round outline are classified with numbers within a range of 24–40, and long hair is classified with numbers in a range of 40–50, then a determination is made that the characteristic vector is within these ranges, the data related to persons within the round-faced and long-haired classifications are grouped and downloaded to the correlator, and thus the process of identification is made more rapid.

The candidates are narrowed down in the process of the search within this limited range, and the search may be halted at the point in time at which the degree of identity, that is to say, the sum of the differences of each number, is less than 20, for example. Alternatively, a search may be conducted from a slightly different point of view. That is to say, there is a possibility that the hair of the person being identified was short but is now long, so that it is also possible to conduct a search without an evaluation of this feature.

In this manner, the present system is capable of highly intelligent processing in exactly the same manner as human beings view the face of another person and use their facial characteristics to successively recall who they are. This type of data processing may be conducted by means of data exchange with, for example, a digital calculator (microprocessor) 902. Microprocessor 902 assesses the degree of identity and makes a determination as to whether to continue with the search or not. In contrast, the correlator 106 and winner-take-all 108 which form the main portions of the present invention conduct a large scale data search in parallel, and find the case having the closest resemblance. If the microprocessor is viewed as the left brain in a human, the parts designated by references 106, 107, and 108 can be said to be the right brain, which is engaged with overall decision making. In this manner, it is possible to realize an electrical circuit having functions corresponding to those of the human brain.

By means of the present invention, it is possible to realize a computing circuit having the function of accepting external data and conducting instantaneous recognition with respect to these data, and by means of this, it is possible to realize an electrical system having intelligent functions such as those in human beings, in which a determination is made with respect to a real world situation, and appropriate action is initiated.

What is claimed is:

1. A computing circuit having an instantaneous recognition function for selecting predetermined codes with respect to a plurality of analog input signals, said computing circuit comprising:

means for converting a plurality of analog input signals to a group of input variables, said input variables comprising one of a plurality of analog variables and a plurality of multi-level variables, said plurality of input variables being smaller in number than said plurality of input signals;

a memory circuit for storing and maintaining a plurality of data, said plurality of data comprising groups of one of a plurality of predetermined analog variables and a plurality of predetermined multi-level variables;

a comparison circuit for conducting a parallel processing operation for effecting predetermined comparison operations of said plurality of variables and said plurality of data;

means for selecting at least one code when said comparison circuit determines that one of said plurality of data meets a predetermined condition;

said comparison circuit comprising:

a first MOS type transistor having a first gate electrode and a first source electrode, said first gate electrode connected to a first signal line of predetermined potential via a first switching element, and a first input electrode capacitively coupled with said first gate electrode;

a second MOS type transistor having a second gate electrode and a second source electrode, said second gate electrode connected to a second signal line of predetermined potential via a second switching element, a second input electrode capacitively coupled with said second gate electrode, said second source electrode connected to said first source electrode; and means for causing said first and second switching elements to conduct and to thereby set the potentials of said respective first and second gate electrodes to the potentials of said respective first and second signal lines in concert with the application of first and second input voltages respectively to said first and second input electrodes and means for respectively inputting said second and first input voltages into said first and second input electrodes, after switching off said first and second switching elements and placing said first and second gate electrodes in an electrically floating state.

2. A computing circuit having an instantaneous recognition function for selecting predetermined codes with respect to a plurality of analog input signals, said computing circuit comprising:

means for converting a plurality of analog input signals to a group of input variables, said input variables comprising one of a plurality of analog variables and a plurality of multi-level variables, said plurality of input variables being smaller in number than said plurality of input signals;

a memory circuit for storing and maintaining a plurality of data, said plurality of data comprising groups of one of a plurality of predetermined analog variables and a plurality of predetermined multi-level variables;

a comparison circuit for conducting a parallel processing operation for effecting predetermined comparison operations of said plurality of variables and said plurality of data;

means for selecting at least one code when said comparison circuit determines that one of said plurality of data meets a predetermined condition;

said memory circuit comprising a third MOS type transistor having an electrically isolated first floating gate, a third electrode capacitively coupled to said first floating gate, a fourth electrode connected to said first floating gate via a tunnel junction, a fifth electrode capacitively coupled to said fourth electrode, a fourth MOS type transistor interconnecting said third and fourth electrode, and means for causing a flow of a tunnel current in said tunnel junction by applying a predetermined potential difference between said third and fifth electrodes, thereby altering the amount of charge within said first floating gate, and causing said fourth MOS type transistor to conduct when said amount of charge reaches a predetermined value.

3. A computing circuit having an instantaneous recognition function for selecting predetermined codes with respect to a plurality of analog input signals, said computing circuit comprising:

means for converting a plurality of analog input signals to a group of input variables, said input variables comprising one of a plurality of analog variables and a plurality of multi-level variables, said plurality of input variables being smaller in number than said plurality of input signals;

a memory circuit for storing and maintaining a plurality of data, said plurality of data comprising groups of one of a plurality of predetermined analog variables and a plurality of predetermined multi-level variables;

a comparison circuit for conducting a parallel processing operation for effecting predetermined comparison operations of said plurality of variables and said plurality of data;

means for selecting at least one code when said comparison circuit determines that one of said plurality of data meets a predetermined condition;

said memory circuit comprising a plurality of memory cells, each said memory cells comprising a third MOS type transistor having an electrically isolated first floating gate, a third electrode capacitively coupled to said first floating gate, a fourth electrode connected to said first floating gate via a tunnel junction and a source electrode;

a first interconnect which is connected via a first switch to each said fourth electrode of said plurality of memory cells;

a second interconnect which is connected via a second switch to each said source electrode of said plurality of memory cells;

a fifth electrode which is capacitively coupled with said first interconnect;

a sixth electrode which is connected to said first interconnect via a fifth MOS type transistor; and means for causing a flow of a tunnel current in said tunnel junction of the memory cell selected by said first and second switches by applying a predetermined potential to said fifth electrode, altering the amount of charge within said first floating gate, and causing said fifth MOS type transistor to conduct when said amount of charge reaches a predetermined value.

4. A computing circuit according to claim 1 wherein said memory circuit comprises:

a third MOS type transistor having an electrically isolated first floating gate, a third electrode capacitively coupled to said first floating gate;

a fourth electrode connected to said first floating gate via a tunnel junction; a fifth electrode capacitively coupled to said fourth electrode; a fourth MOS type transistor interconnecting said third and fourth electrodes, and means for causing a flow of a tunnel current in said tunnel junction by applying a predetermined potential difference between said third and fifth electrodes, thereby altering the amount of charge within said first floating gate and causing said fourth MOS type transistor to conduct when said amount of charge reaches a predetermined value.

5. The computing circuit according to claim 1 wherein said memory circuit comprises:

a plurality of memory cells, each said memory cell comprising a third MOS type transistor having an electrically isolated first floating gate, a third electrode capacitively coupled to said first floating gate, a fourth electrode connected to said first floating gate via a tunnel junction and a source electrode;

a first interconnect which is connected via a first switch to each said fourth electrode of said plurality of memory cells;

a second interconnect which is connected via a second switch to each said source electrode of said plurality of memory cells;

a fifth electrode which is capacitively coupled with said first interconnect;

a sixth electrode which is connected to said first interconnect through a fifth MOS type transistor; and means for causing a flow of a tunnel current in said tunnel junction of the memory cell selected by said first and second switches for applying a predetermined potential to said fifth electrode, altering the amount of charge within said first floating gate, and causing said fifth MOS type transistor to conduct when said amount of charge reaches a predetermined value.

* * * * *